(12) United States Patent
Wu et al.

(10) Patent No.: US 7,627,629 B1
(45) Date of Patent: Dec. 1, 2009

(54) METHOD AND APPARATUS FOR MULTIPOINT CONFERENCING

(75) Inventors: Fang Wu, San Jose, CA (US); Wen-hsiung Chen, Sunnyvale, CA (US); Philip R. Graham, Milpitas, CA (US); Gregory D. Pelton, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1127 days.

(21) Appl. No.: 10/326,617

(22) Filed: Dec. 19, 2002

(51) Int. Cl.
*G06F 15/16* (2006.01)
(52) U.S. Cl. .................. 709/204; 709/224; 709/227; 709/230; 709/231; 709/233; 348/14.09
(58) Field of Classification Search .............. 709/204, 709/224, 227, 230, 231, 233; 348/14.09; 379/202.01
See application file for complete search history.

(56) References Cited

U.S. PATENT DOCUMENTS

| | | | | |
|---|---|---|---|---|
| 5,453,780 | A | 9/1995 | Chen et al. ............... 348/15 |
| 5,764,277 | A | 6/1998 | Loui et al. ............... 348/14 |
| 5,841,763 | A * | 11/1998 | Leondires et al. ......... 370/260 |
| 6,509,925 | B1 * | 1/2003 | Dermler et al. .......... 348/14.09 |
| 6,526,445 | B1 * | 2/2003 | Kumar et al. ............ 709/227 |
| 6,535,240 | B2 * | 3/2003 | Yang et al. ............ 348/14.08 |
| 6,687,234 | B1 * | 2/2004 | Shaffer et al. ........... 370/260 |
| 6,731,734 | B1 * | 5/2004 | Shaffer et al. .......... 379/202.01 |
| 6,738,343 | B1 * | 5/2004 | Shaffer et al. ........... 370/216 |
| 6,781,964 | B1 * | 8/2004 | Klaghofer ............... 370/261 |
| 7,158,487 | B1 * | 1/2007 | Klaghofer et al. .......... 370/261 |
| 7,174,365 | B1 * | 2/2007 | Even et al. ............ 709/204 |
| 7,213,050 | B1 * | 5/2007 | Shaffer et al. .......... 709/204 |
| 7,257,641 | B1 * | 8/2007 | VanBuskirk et al. ........ 709/238 |
| 7,328,240 | B2 * | 2/2008 | El-Gebaly et al. ......... 709/204 |
| 2002/0033880 | A1 * | 3/2002 | Sul et al. ............... 348/14.09 |
| 2003/0005054 | A1 * | 1/2003 | El-Gebaly et al. ......... 709/204 |
| 2007/0005804 | A1 * | 1/2007 | Rideout ............... 709/246 |

OTHER PUBLICATIONS

"Multipoint Conferencing: RADVision MCU-323 Multipoint Conferencing Unit", RADVision Ltd., Israel, 2000. Also available at www.radvision.com.

(Continued)

*Primary Examiner*—Shawki S Ismail
(74) *Attorney, Agent, or Firm*—Dov Rosenfeld; INVENTEK

(57) ABSTRACT

A method of controlling a multimedia multipoint conference that includes two or more participating multimedia terminals that each includes one or more codecs. Also a controller to control the multimedia multipoint conference. The method includes receiving from each participant information on its codec capabilities, determining codec output characteristics for each participant, including one or both of a codec type and a bit rate, and sending instructions to the participants to set their respective codec to the respective determined codec output characteristics. After each participant's one or more codecs are set to the respective codec output characteristics, the method includes receiving a media stream from one or more of the participants. The media stream from any particular participant is encoded at the determined codec output characteristics for the particular participant. The method further includes passing the received media streams to each participant. The determined codec output characteristics is such that the received media streams may be passed to each participant without any decoding and re-encoding.

47 Claims, 8 Drawing Sheets

OTHER PUBLICATIONS

H. ElGebaly, "Characterization of Multimedia Streams of an H.323 Terminal", *Intel Technology Journal Q2 '98*, pp. 1-9, Intel Corporation, Santa Clara, CA, 1998.

J. Toga and H. ElGebaly, "Demystifying Multimedia Conferencing Over the Internet Using the H.323 Set of Standards", *Intel Technology Journal Q2 '98*, pp. 1-11, Intel Corporation, Santa Clara, CA, 1998.

J. Glasmann, W. Kellerer, and H. Muller, "Service Architectures in H.323 and SIP—A Comparison", pp. 1-15, Munich University of Technology (TUM), Germany.

S. Gavish, "Multipoint Control Unit", Accord Networks, PowerPoint slides for Presentation, Atlanta, Georgia (now part of Polycom, Pleasanton, CA). Also available at www.accordnetworks.com.

\* cited by examiner

METHOD AND APPARATUS FOR MULTIPOINT CONFERENCING

BACKGROUND

This invention is related to multimedia communications systems, and in particular to a method for controlling a multipoint multimedia teleconference and a controller therefor.

Multimedia multipoint conferences, commonly called multimedia teleconferences, are becoming more and more widespread. A multimedia teleconference allows a three or more of participants at a plurality of locations to establish bi-directional multimedia communication, while sharing the audio-visual environment, in order to give the impression that the participants are all at the same place.

Typical prior art multipoint conferences use a Multipoint Control Unit (MCU). Prior art MCUs are typically complex and require significant computational power because the MCU functionality includes a function typically requiring transcoding—including decoding and re-encoding—the incoming encoded media streams—including both audio and video when both are used. The decoding and re-encoding is typically to create the mixing affects to create new content to send to meet the bandwidth requirements. Thus there is a need for an alternative to prior art MCUs that include transcoding.

The invention is described herein using International Telecommunication Union (ITU, ITU-T) Recommendations H.323 and H.320 as an example. The invention, however, is not limited to H.323 or H.320.

ITU-T Recommendation H.323 titled "Packet-based multimedia communications systems" (International Telecommunication Union, Geneva, Switzerland) describes the technical requirements for multimedia communications services in a packet-switched network. The packet-switched networks may include local area networks (LANs), wide area networks (WANs), public networks and internetworks such as the Internet, point-to-point dial up connections over PPP, or using some other packet-switched protocol.

H.323 specifies four major components: Terminals, Gateways, Gatekeepers, and Multipoint Control Units (MCU). Terminals, Gateways, and MCUs are classified as Endpoints. Endpoints are devices that can initiate and receive calls. Other components associated with H.323 are the codecs used to encode, i.e., compress and decode, i.e., de-compress audio and video transmissions.

H.323 terminals use codecs to encode (compress) audio and/or video signals in order to reduce the network bandwidth required for communication. Codecs differ in a number of characteristics, including speech or picture quality, bandwidth required for signal transmission, and processor (CPU) utilization. According to H.323, all endpoints must support the G.711 voice codec standard (ITU-T Recommendation G.711 titled "Pulse code modulation (PCM) of voice frequencies"). Most endpoints also support the G.723.1 low-bandwidth voice codec standard (ITU-T Recommendation G.723.1 titled "Dual rate speech coder for multimedia communications transmitting at 5.3 and 6.3 kbit/s"). A H.323 endpoint may also include, but does not need to include video capabilities. If video is provided, the endpoint must support the H.261 video codec standard (ITU-T Recommendation H.261 titled "Video codec for audiovisual services at p×64 kbit/s"). Support for other standards such as H.263 (ITU-T Recommendation titled "Video coding for low bit rate communication") may be included, but are not required. Most commercial video conferencing systems today support H.263.

H.323 specifies a call setup process that includes negotiating the capabilities of the participants, including for example which codec(s) will be used by each participant.

Terminals: H.323 terminals are client endpoints that provide real-time, two-way communications. A terminal provides at least real-time audio communications. A terminal may also provide video and/or data conferencing. Data conferencing provides capabilities such as text chat, shared white boarding, and data exchange. If data conferencing is included, such data conferencing needs to conform to ITU-T Recommendation T.120 titled "Data protocols for multimedia conferencing."

A terminal may be a stand-alone device, or implemented in software—including a "H.323 stack"—running on a computer such as a personal computer (PC). Stand-alone devices include video telephones and Internet telephones. Today, the vast majority of terminals are PCs running terminal software programs that include a H.323 stack. While not specifically addressed by Recommendation H.323, PC-based terminals typically use a sound card, typically a full duplex sound-card, and a microphone with speakers, or a headset.

Gateways: An H.323 gateway is an endpoint that provides a real-time, two-way connection between a H.323 network and a non-H.323 network. A gateway thus provides a connection between H.323 terminals and other ITU terminals, e.g. telephones, or between H.323 terminals and another H.323 gateway. An H.323 gateway performs the translation of call control and call content necessary to convert a call from a packet-switched format, e.g., H.323 to another format such as a circuit-switched format, e.g. PSTN or a private voice network, and vice versa. Gateways are optional components in a H.323 network. They are only needed when connecting to other types of terminals such as telephones or H.320 (ISDN videoconference) terminals (ITU-T Recommendation H.320 titled "Narrow-band visual telephone systems and terminal equipment").

Gatekeepers: A gatekeeper is an optional H.323 component that provides several important services. Most H.323 networks typically include a gatekeeper. When present, a gatekeeper provide services such as address zone-management, call-routing services, bandwidth management, and admissions control to limit conferencing bandwidth to some fraction of the total available bandwidth so other data services such as e-mail and file transfers can still function. Additionally, Gatekeepers provide address translation services between LAN aliases for terminals and gateways and IP or IPX addresses. Gatekeepers also provide accounting, billing, and charging services, when needed.

Multipoint Control Units: The Multipoint Control Unit (MCU) is an optional H.323 endpoint that provides the services necessary for three or more terminals to participate in a multipoint conference, also called a conference call or a teleconference. All terminals participating in the conference establish communication with the MCU. The MCU ensures that multipoint conference connections are properly set up and released, that audio and video streams are properly switched and/or mixed, and that the data are properly distributed among the conference participants. By using a central multipoint topology, each terminal at a different location sends its data to a MCU. The MCU negotiates between terminals for the purpose of determining which codec the MCU needs to use, and then may handle the media stream. After processing all the data, MCU sends back the mixed and switched data to each participant.

The function(s) of a MCU may be handled by a central multi-media conference server (centralized MCU), or alternately by a network of conference servers that operate cooperatively to act like one central multi-media conference server (distributed MCU). The MCU functions may be integrated in other H.323 components.

An MCU includes a Multipoint Controller (MC) and optionally one or more Multipoint Processors (MP). An MC takes care of the required call set up messages and the required messages that are used to set up the terminal media capability and to negotiate the functions for audio and video processing. Such messages and negotiations conform to H.245 (ITU-T Recommendation H.245 titled "Control Protocol for multimedia communication"). The MP(s) when present in the MCU each switches, mixes, and translates video, audio, and data streams. Thus, each MP in a MCU receives media streams from one or more conference participants, and processes and distributes the media streams to the terminals in a conference. The MC controls resources by determining what data flows are to be transmitted by the MP(s) in the MCU.

Switching ensures that a certain data flow is sent if several data flows are available (for example with the matching video sequences, if the speaker in a conference changes identified by an audio signal, or if a change is requested via H.245). Mixing allows several data flows to be combined. Mixing and switching includes splitting a created image into several segments and re-coding so that each party of the conference may be continuously present.

The one or more MPs 207 of MCU 203 each handles the required video and audio mixing and switching. The mixing typically requires transcoding. Transcoding typically includes decoding all the incoming video signals for every video conferencing terminals, scaling the signals for all other terminals, reformatting the signals for all the terminals, and organizing each of the image and mixing them into a designated position, then re-encoding the mixed audio and video signals and sending the encoded audio and video streams to each of the terminals in communication with the MCU.

Such processing is typically computationally complex, particularly when video is included, and requires a significant amount of processing power. Prior art MCU architectures thus have several disadvantages, including the following:

- An MCU is a relatively complicated device that requires significant processing power to operate. For example, more and more new video compression standards emerge. Because a MCU device needs to be able to handle all such standards, the performance deteriorates dramatically as more and more terminals adopt more and more of the emerging video compression standards.
- An MCU needs to transcode video and audio streams. Transcoding includes decoding, scaling, reformatting, and re-coding the incoming video signal to the different formats of the different output video signals that are required for the connected terminals. Transcoding typically includes decoding and re-coding that introduces additional quantization error that causes picture quality to deteriorate.
- Because of the time required for switching, matching and transcoding, a MCU may introduce a significant amount of delay to the incoming signals.

Thus, there is a need in the art for an improved MCU that does not require the switching, matching and/or transcoding of streams such as media streams. Such processing is usually carried out by one or more MPs, thus there is a need in the art for an improved MCU that does not require any MPs. There also is a need in the art for a MCU that does not require the computational power of prior art MCUs, that does not introduce as much delay as do prior art MCUs, and that does not deteriorate picture quality as might a prior art MCU. There further is a need in the art for a method of controlling a multipoint conference that when possible, avoids the media streams sent by any participant needing to be decoded and re-encoded en route to the other participants.

SUMMARY

Described herein is a method of controlling a multimedia multipoint conference that includes two or more participating multimedia terminals that each includes one or more codecs. The method includes receiving from each participant information on its codec capabilities, determining codec output characteristics for each participant, including one or both of a bit rate and a codec type, and possibly including the video resolution, mixing positions and so forth, and sending instructions to the participants to set their respective codec to the respective determined codec output characteristics.

After each participant's one or more codecs are set to the respective codec output characteristics, the method includes receiving a media stream from one or more of the participants. The media stream from any particular participant is encoded at the determined codec output characteristics for the particular participant. The method further includes passing the received media streams to each participant. The determined codec output characteristics is such that the received media streams may be passed to each participant without any decoding and re-encoding.

In one embodiment, the sending and receiving is via a packet network. In another, is it via a circuit switched network. In one embodiment, the media streams conform to H.323. In one embodiment, the media stream includes a video stream.

In an embodiment that uses H.245 compatible control messages, a MCU receives TerminalCapabilitySet from a terminal, and instead of passing the message to the other one or more participants, waits until it has obtained a TerminalCapabilitySet from each participant. Based on the TerminalCapabilitySet messages received from all the participants, the MCU determines the codec output characteristics for each of the participants. In one embodiment, the MCU instructs each participant by mimicking TerminalCapabilitySet messages from the other participants, but with the parameters of the TerminalCapabilitySet message set to the determined codec output characteristics such that each participant sends media streams at codec output characteristics that ensure that the MCU does not need to do MP (Multipoint Processor) related work such as to decode and to re-encode any of the streams.

Also described herein is a method of controlling a multimedia multipoint conference that includes a plurality of participants. Each participant is either a multimedia terminal or a gateway that includes one or more codecs. The method includes receiving from each participant information on the capabilities of its one or more codecs. Such information includes which one or more codecs the participant has, and the capabilities of each such codec. In the case that a gateway is included, an embodiment further includes receiving information from the gateway on the bandwidth available to each participant for input and output.

The method includes ascertaining if there is a set of codec output characteristics for all participants such that each participant's codec capabilities can be simultaneously met-within each codec's available bandwidth when a gateway is included-without any media stream from one participant to the other participants needing to be decoded and re-encoded en route to the other participants. Is there such a set, the method includes determining the codec output characteristics for all participants that simultaneously meet each participant's codec capabilities without any decoding and re-encoding being needed. The codec output characteristics include one or more of a codec type and a bit rate. In one embodiment, when the media streams include video, the codec output characteristics may include the video resolution.

Once the set of codec output characteristics has been determined, the method includes sending instructions to the participants to set the respective one or more codecs to the determined codec output characteristics, e.g., to choose the codec type, set the bit rate, and so forth.

After each participant's one or more codecs are set to the respective codec output characteristics, the participants can successfully send and receive media streams encoded at the respective determined codec output characteristics of the respective terminal without any en route decoding and re-encoding of any of the media streams. By successfully sending a media stream is meant that the recipient receives and successfully decodes the media stream.

In one embodiment, only those participants whose modems need to be re-set are sent the instruction.

One embodiment includes an MCU implementing the method. If the step of ascertaining ascertains that there are not codec output characteristics that simultaneously meet the codec capabilities of all participants, the method further includes instructing the participants to communicate via the MCU.

It may still be that the MCU includes one or more MPs that can decode, scale, and re-encode streams as necessary to meet different codecs' characteristics.

In one embodiment, the MCU selects a first set of common codec characteristics, and instructs the subset of the participants that are capable of encoding at the first set of common codec characteristics to set their respective codecs to output at that first set of common codec characteristics. If the first subset does not include all participants, the MCU finds a second set of codec characteristics for the remaining participants, and instructs the subset of the remaining participants that are capable of encoding with the second set of codec characteristics to so communicate. The MCU repeats these steps until all participants have been instructed with respective codec characteristics. By so partitioning the set of participants into subsets that each has common codec characteristics, the MCU minimizes the amount of MP processing needed for transcoding between different types of codecs.

According to one embodiment, if the step of ascertaining ascertains that there are codec output characteristics that simultaneously meet the codec requirements of all participants, the method instructs the participants to communicate directly, thereby bypassing any MCU.

DETAILED DESCRIPTION

Described herein is a MCU that does not require decoding and re-encoding, and thus may be less complex than prior-art MCUs. Also described herein is a method for controlling a multipoint conference that, that when possible, avoids the media streams sent by any participant needing to be decoded and re-encoded en route to the other participants. One embodiment is a MCU that does not require any MP functionality. Also described herein is a method for controlling a multipoint conference without transcoding. Also described herein are terminals that operate so that a MCU need not carry out transcoding of streams. By transcoding is meant a process that includes decoding a video stream and re-encoding.

Figure 1:
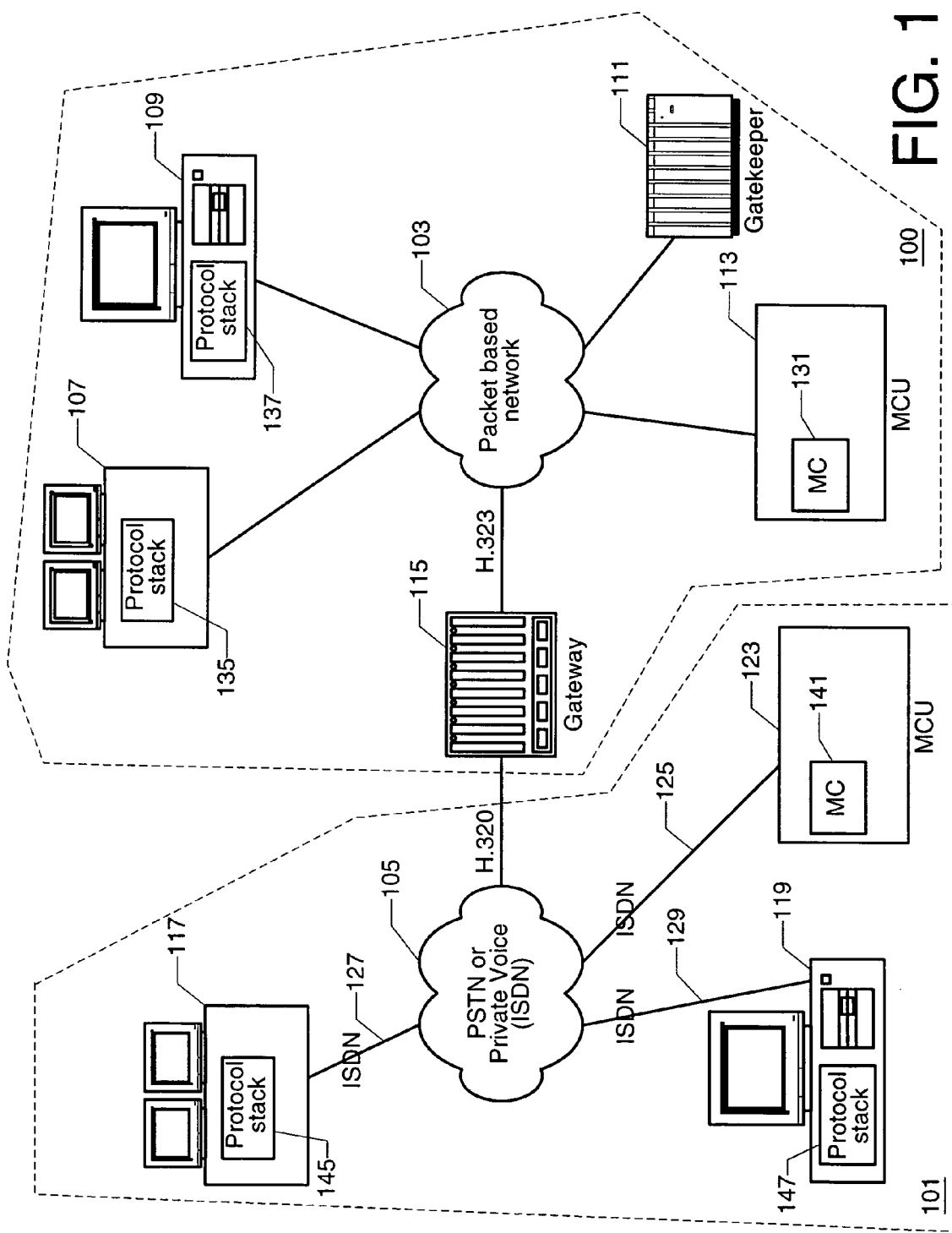
FIG. 1 shows an example of a configuration using video conferencing equipment. A multipoint conference may include the H.320 and the H.323 components connected via a gateway.

FIG. 1 shows a typical example of a configuration using multimedia conferencing equipment. The multimedia conferencing equipment shown can be configured to set up a multipoint conference that includes a H.323 conforming part 100 of the multipoint conference, and a H.320 conforming part 101 of the multipoint conference. The H.323 part 100 uses network 103, a packet network that in one embodiment uses TCP/IP. Network 103 may be a LAN, a WAN, or an internetwork such as the Internet. The H.323 part 100 includes a terminal 107, an interactive video group terminal that includes a H.323 protocol stack 135 (including a codec) and a plurality of video screens. The H.323 part 100 also includes terminal 109, a PC-based desktop video conferencing terminal that includes a H.323 protocol stack 137 (including a codec) and a video display. The terminals 107 and 109 are each coupled to network 103 via respective network links, e.g., Ethernet links.

The H.323 part 100 shown in FIG. 1 also includes a gatekeeper 111 and a MCU 113 each coupled to network 103 via respective network links. The MCU includes a MC 131. A prior art MCU might also include one or more MPs, while a MCU embodiment according to one or more aspects of the invention does not require decoding any media streams, and in one embodiment, does not require any MPs. The terminals and the MCU communicate via network 103.

The H.323 part 100 of the network shown in FIG. 1 also includes a gateway 115 to a switched network 105 that provides ISDN and that in different configurations may be a PSTN network or a private voice network. Switched network 105 is used in the H.320 part 101 of the multipoint conference. Thus Parts 100 and 101 are coupled via the gateway. Part 101 includes terminal 117, an second interactive video group terminal system that includes a H.320 protocol stack 145 (including a codec) and a plurality of video screens, and terminal 119, a second PC-based desktop video conferencing system that also includes a H.320 protocol stack 147 (including a codec) and a video display. The terminals 117 and 119 are each coupled to network 105 via circuits 127 and 129, respectively, that in one embodiment are ISDN circuits. Another ISDN circuit 125 connects the switched network 105 to a second MCU 123 that includes an MC 141. A prior art MCU might also include one or more MPs, while a MCU embodiment according to one or more aspects of the invention does not require decoding of any media streams, and in one embodiment, does not require any MPs.

Figure 2:
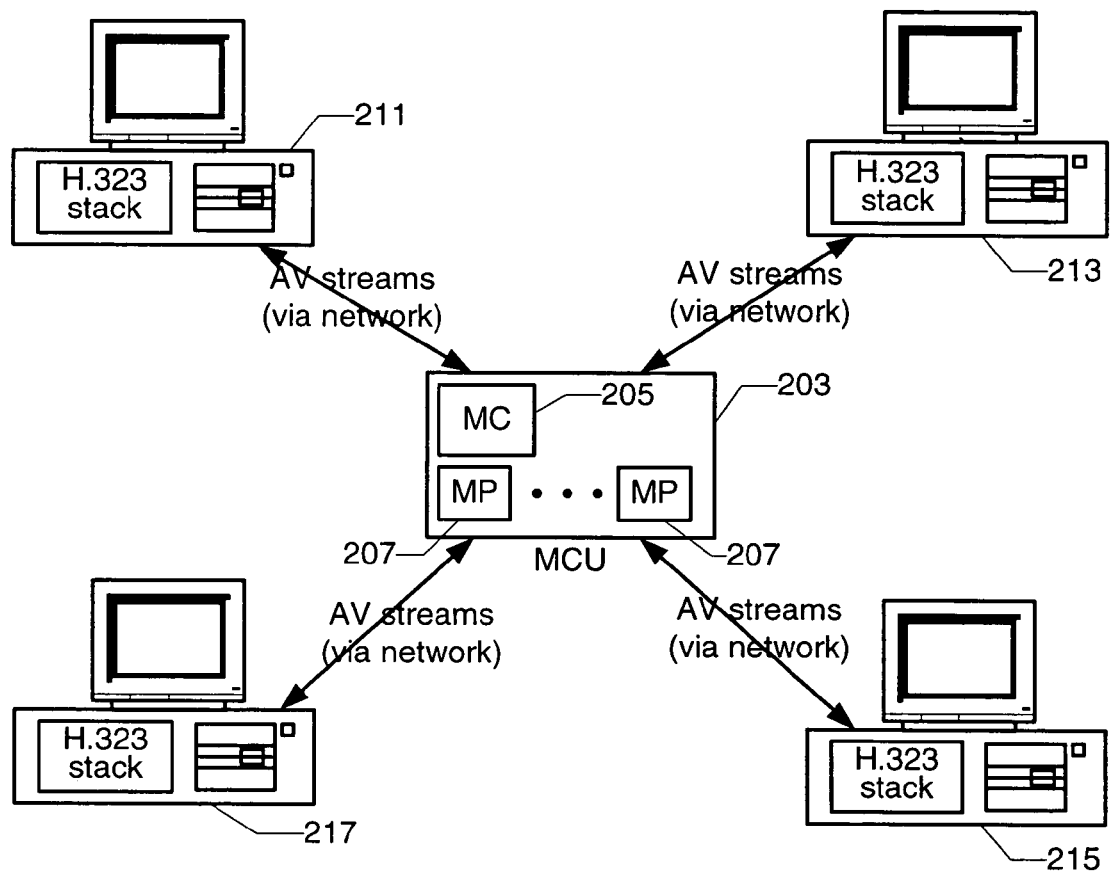
FIG. 2 shows the logical connection of a prior art MCU and four prior art terminals in a traditional centralized multipoint conference system.

FIG. 2 shows the logical connection of a prior art MCU 203 and four terminals 211, 213, 215, and 217 in a traditional centralized multipoint conference system. Each of the logical connection is via a network such as network 103 (FIG. 1). MCU 203 includes MC 205 and a set of MPs 207. The terminals 211, 213, 215, and 217 participate in a multipoint conference by exchanging messages via MCU 203. Each of the terminals includes a protocol stack conforming to H.323. Many types of terminals are available, and in such terminals, one or more of the protocol stack components may be implemented by software, by hardware, or by a combination of software and hardware.

A call is set up by the terminals exchanging messages via a gatekeeper if present, and via the MCU. The process starts with call signalling according to H.225 (ITU-T Recommendation H.225 titled "Call signalling protocols and media stream packetization for packet-based multimedia communication systems") to set up connections between the terminals. Once communication channels are set up, the terminals then exchange messages that according to H.323 conform to H.245. These messages are to exchange the capabilities of each of the participants in the multipoint conference, and are sent between the terminals via the MCU 203.

Table 1 below lists the H.245 messages that may be exchanged between two terminals, e.g., terminal 211 and 213 via the MCU 203 according to the prior art.

message. In a message 306, T2 then confirms the connection establishment by sending a H.225 connect message to T1, and the call is established.

After the setup, a H.245 control channel is established between T1 and T2. The terminals can now exchange H.245 control messages. In a message 307, T1 sends a H.245 TerminalCapabilitySet message to T2 to exchange its capabilities.

A H.245 TerminalCapabilitySet message includes a set of fields that together describe the media capabilities of the terminal, including the audio codec type(s), any video codec type(s), the video resolution(s), the maximum bit-rate(s) and some of codec specific options.

In a message 308, T2 acknowledges T1's capabilities by sending a H.245 TerminalCapabilitySetAck message. In a message 309, T2 exchanges its capabilities with T1 by sending a H.245 TerminalCapabilitySet message. In a message 310, T1 acknowledges T2's capabilities by sending a H.245 TerminalCapabilitySetAck message. In a message 311, T1 opens a media channel with T2 by sending a H.245 openLogicalChannel message. In a message 312, T2 acknowledges the establishment of the unidirectional logical channel from T1 to T2 by sending a H.245 openLogicalChannelAck message. Then, in a message 313, T2 opens a media channel with T1 by sending a H.245 openLogicalChannel message. In a message 314, T1 acknowledges the establishment of the unidirectional logical channel from T2 to T1 by sending a H.245 openLogicalChannelAck message. The bidirectional media stream communication is now established.

TABLE 1

| Message | Function |
|---|---|
| Master-Slave Determination | Determines which terminal is the master and which is the slave. Possible replies: Acknowledge, Reject, Release (in case of a time out). |
| TerminalCapabilitySet | Contains information about a terminal's capability to transmit and receive multimedia streams. Possible replies: Acknowledge, Reject, Release. |
| OpenLogicalChannel | Opens a logical channel for transport of audiovisual and data information. Possible replies: Acknowledge, Reject, Confirm. |
| CloseLogicalChannel | Closes a logical channel between two endpoints. Possible replies: Acknowledge |
| RequestMode | Used by a receive terminal to request particular modes of transmission from a transmit terminal. General mode types include VideoMode, AudioMode, DataMode and Encryption Mode. Possible replies: Acknowledge, Reject, Release. |
| SendTerminalCapabilitySet | Commands the far-end terminal to indicate its transmit and receive capabilities by sending one or more Terminal Capability Sets. |
| EndSession Command | Indicates the end of the H.245 session. After transmission, the terminal will not send any more H.245 messages. |

Figure 3:
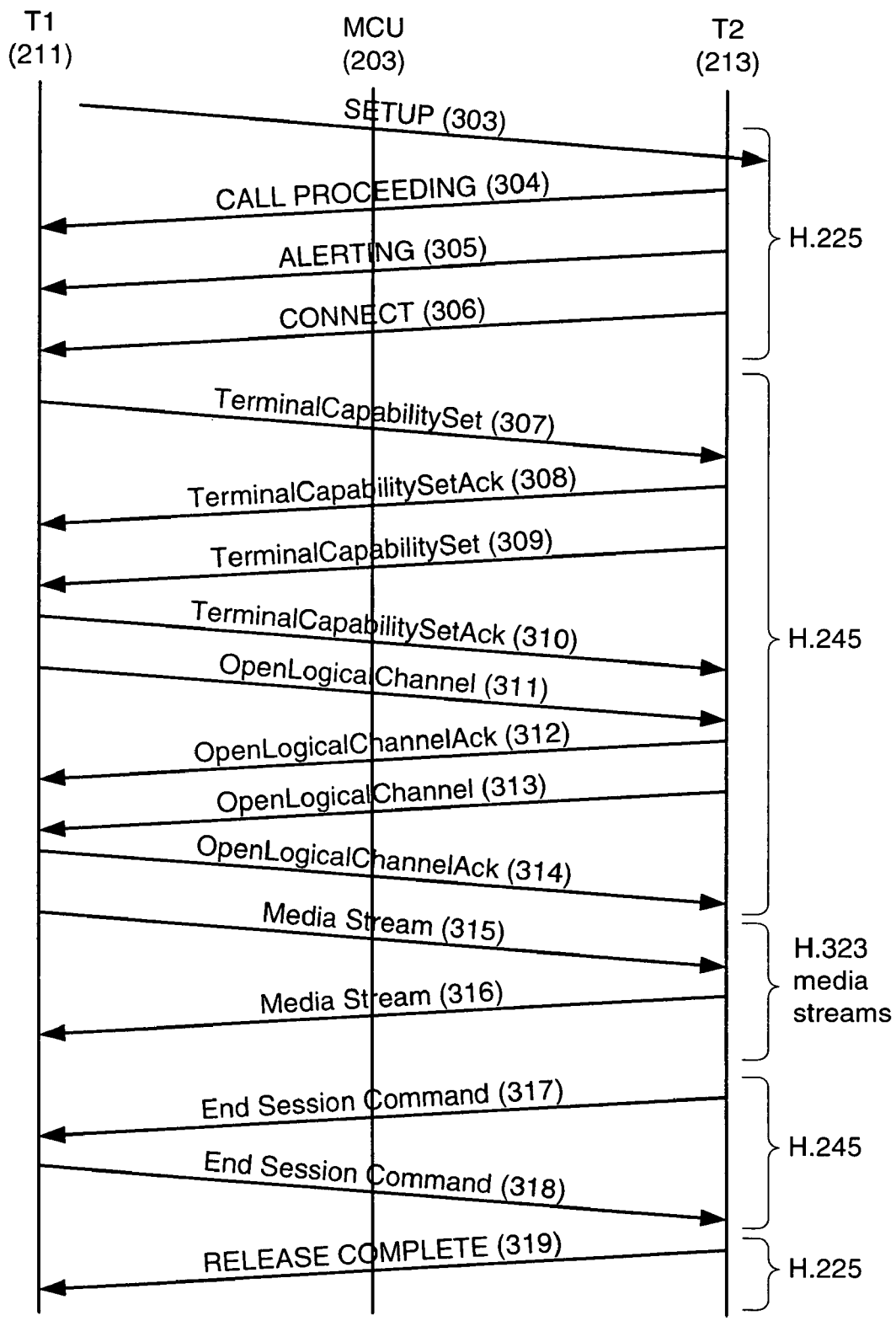
FIG. 3 shows a simplified example of a prior art call between a first terminal and a second terminal. No gatekeeper is assumed.

FIG. 3 shows a simplified example of a prior art call between a first terminal 211 (called T1) and a second terminal 213 (called T2). Any communication between any gatekeeper that's involved is not shown. An MCU is used, e.g., because there is a possibility of more than two terminals participating. The process starts with call signalling according to H.225 to set up connections between the two terminals. In a message 303, T1 sends a H.225 setup message to T2 requesting a connection. In a message 304, T2 responds with a H.225 call proceeding message to T1. In a message 305, T2 alerts T1 of the connection establishment by sending a H.225 alerting In a message 315, T1 sends a H.323 media stream to T2, and in a message 316, T2 sends a H.323 media stream to T1. These messages continue until one of the terminals releases a call.

In the example shown in FIG. 3, T2 initiates the call release. In a message 317, T2 sends a H.245 EndSessionCommand message to T1. In a message 318, T1 releases the call endpoint and confirms the release by sending a H.245 EndSessionCommand message to T2. T2 completes the call release by sending a H.225 release complete message to T1.

Thus, after a setup phase (H.225 and H.245 messaging), full duplex communications between the terminals and the MCU are established. The terminals 211, 213, 215, and 217 each sends encoded, i.e., compressed media streams to MCU 203, and receives encoded, i.e., compressed media streams from MCU 203.

When prior art MCU 203 receives each encoded media stream that includes video, it may be necessary to decode, re-scale, re-assemble, and re-encode one or more video streams. In such a case, MCU 203 decodes each video and re-scales each decoded video to adjust the resolution for each of the terminals as necessary. MCU 203 further re-assembles the decoded and resolution reduced videos together, e.g., to mix video messages, re-encodes the reassembled video, and sends the respective re-assembled video back to each of terminals 211, 213, 215, and 217 in the appropriate format for the respective terminal. Thus the prior art MCU may need to transcode-defined as a process that includes decoding and re-encoding-one or more of the media streams. One or more of the MPs 207 carries out such processing.

MCU in a Centralized Control Topology

Figure 4:
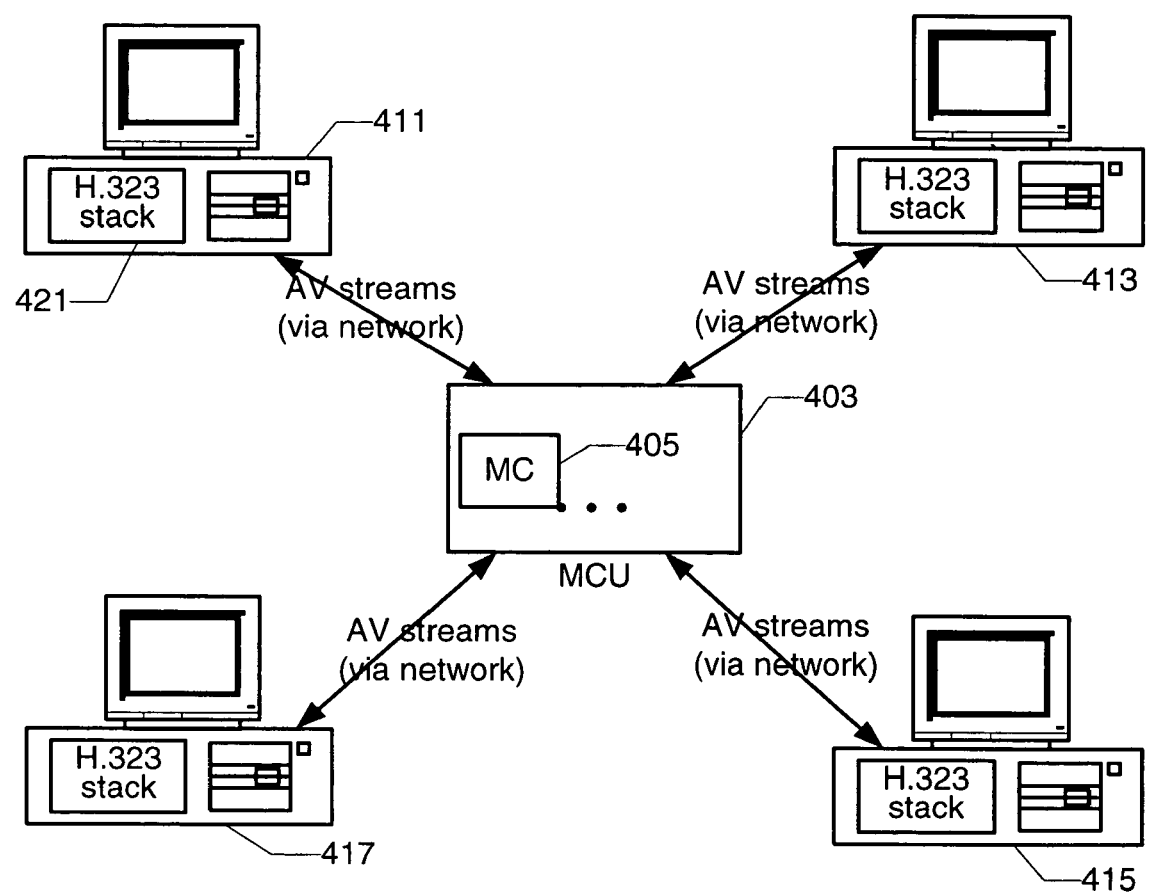
FIG. 4 shows a MCU that operates according to one or more aspects of the invention in a typical centralized control topology with four participants that operate according to one or more aspects of the invention.

One aspect of the invention is an MCU that controls the conference in such a manner that no decoding and re-encoding of media streams is needed en route from one participant to another. FIG. 4 shows such an MCU 403 in a typical centralized control topology with four participants. Each of the participants, in this case terminals 411, 413, 415, and 417 also operates according to one or more aspects of the invention. Note that one or more of the participants may be a gateway to another network, e.g., to a set of other participants in a H.320 configuration as shown in FIG. 1. Each of the terminals 411, 413, 415, and 417 attempts to communicate with MCU 403 and set up a multimedia conference that may includes video. Each terminal has an audio stream input, an audio stream output, and in the case that video is included, a video stream input, a video stream output. Each terminal includes at least one audio codec and, if video is included, at least one video codec.

Figure 5:
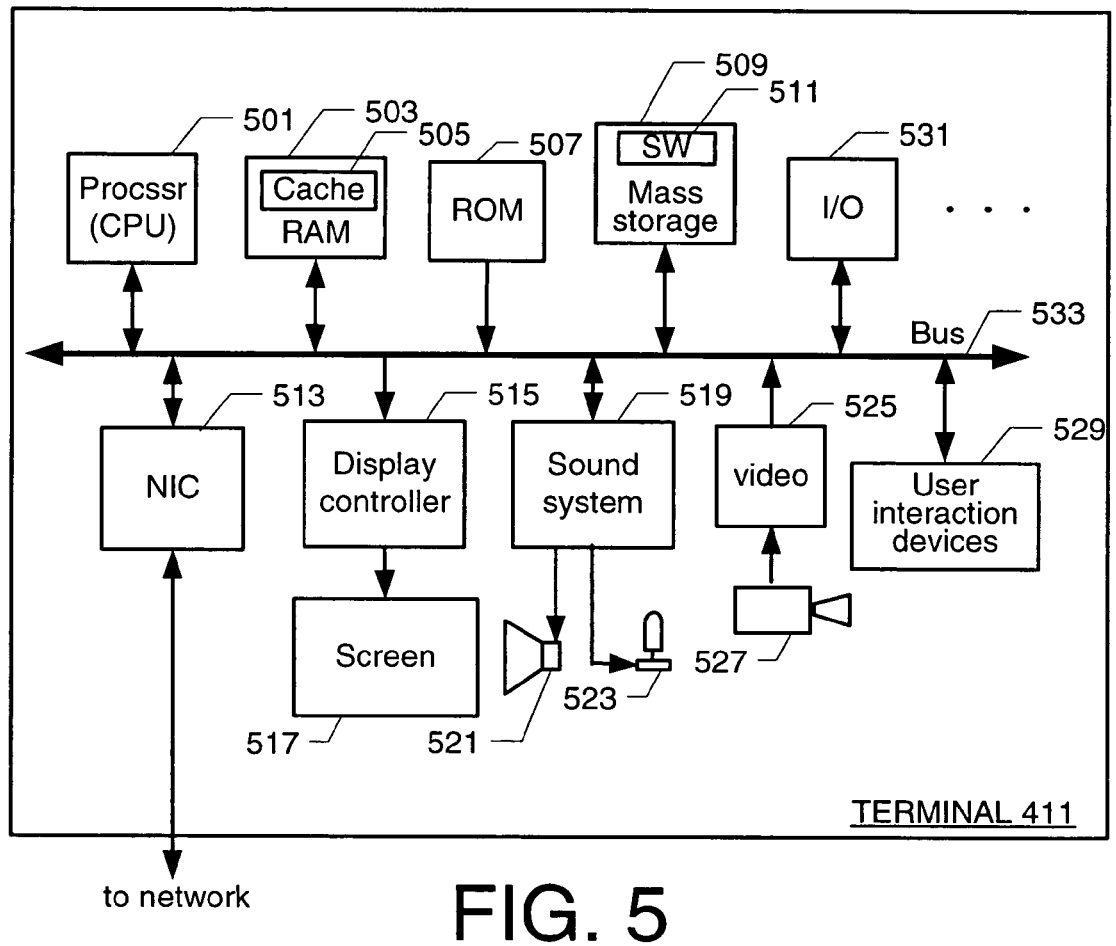
FIG. 5 shows one embodiment of a terminal that is based on a standard computer.

FIG. 5 shows one embodiment of a terminal, e.g., terminal 411 that is based on a standard personal computer (PC). The terminal includes a central processing unit (CPU) 501, a random access memory (RAM) 503 that includes one or more cache memories 505, a mass storage device 509, a display controller 515 connected to a display 517, a video interface device 525 connected to a video camera 527, a sound system 519 connected to a speaker 521 and a microphone 523, a network interface device (NIC) 513 for connecting to network 103, and one or more user interaction devices 529 such as a pointing device, a keyboard, and so forth. Terminal 411 may also include read only memory (ROM) 507 and other I/O devices generally shown as 531, such as a CD-read/write device, an input scanner, a printing device, and so forth. One or more busses, shown symbolically in FIG. 5 as a single bus 533 interconnect the various components. The mass storage device 509 may include a magnetic, optical, or other equivalent storage medium.

While the terminal 411 is shown having a single processor 501, it is to be understood that the terminal may actually have several processors, schematically shown as only one processor in FIG. 5. Furthermore, more than one display screens may be included, schematically shown as only one screen in FIG. 5. Furthermore, in addition to or alternate to the loudspeaker, earphones may be included, e.g., in combination with a microphone. Thus, those in the art will understand that FIG. 5 is a simplified configuration. Actual implementations may include more or less components than shown.

In one embodiment, the H.323 functionality, as well as aspects of the invention operate as software, i.e., one or more computer readable code segments that when loaded into RAM 503 instruct one or more of the processors 501 of terminal 411 to carry out the processes that provide H.323 functionality as well as one or more aspects of the invention. The code segments are carried on a carrier medium, e.g., a magnetic medium as part of storage 509, shown herein as software 511. The code segments may initially be provided as a software product carried in optical media, e.g., a CD-ROM, or carried as signals for transmission via a network.

Figure 6:
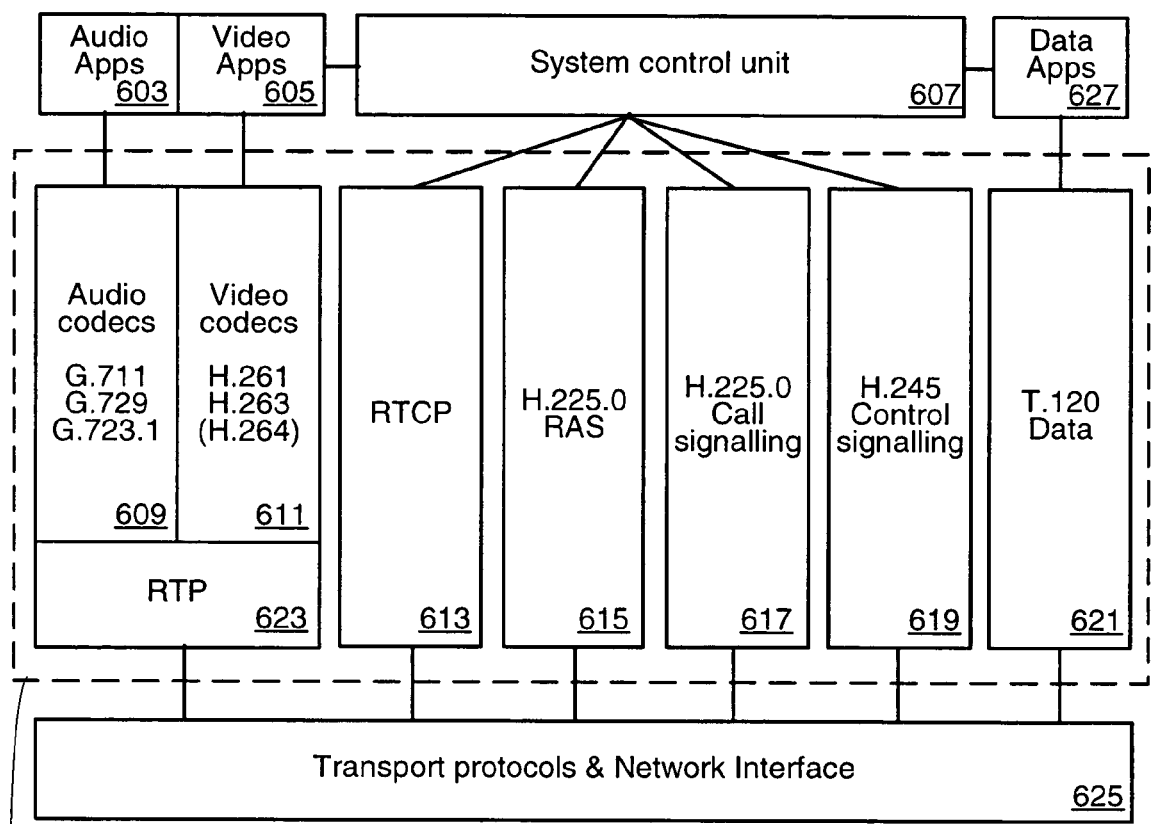
FIG. 6 shows a H.323 stack and related components that reside in a terminal. In one embodiment, the stack is realized in the form of software.

Thus, the terminal 411 includes a H.323 stack 421 (FIG. 4). The stack and its components are shown in FIG. 6 and reside in terminal 411, in one embodiment in the form of software. The H.323 stack 421 is shown in a dotted box.

The stack includes one or more audio codecs 609, one or more video codecs 611, and a component 623 to implement the real time protocol (RTP) for transporting media over UDP. The RTP component 623 is coupled to the transport protocols and network interface 625 in the terminal 411 that provides for sending and receiving packets via the NIC 513.

Note that while the present H.323 (late 2002) specifies optional video codecs conforming to ITU-T Recommendations H.261 and H.263, other codecs standards may be known or become known, and different terminal embodiments may include one or more such other codecs. For example, a codec may be included that conforms to the present ITU-T draft Recommendation, H.264/MPEG-4 Advanced Video Codec (AVC) being developed by the Joint Video Group (JVT) of ITU-T and the ISO/EEC JTC1/SC29/WG11 MPEG group. The H.264 codec was previously called the H.26L codec, and is designed to meet not only multimedia conferencing requirements, but a whole range of applications from low bit rate Internet streaming applications to HDTV broadcast and Digital Cinema applications.

Because video streams compressed according to advanced techniques such as the H.264/MPEG-4 codec may require significant computational power to encode, and significantly less computational power to decode, in one embodiment the decoding capabilities and the encoding capabilities of a terminal may be separately specified. For example, a terminal that does not have a hardware encoder or a very powerful processor may be able to decode more formats than it is able to encode.

Other terminal embodiments may not include any video codec.

The one or more audio codecs 609 are connected to an audio application component 603 that is coupled to the sound system 519 to output and input audio. The one or more video codecs 611 are connected to a video application component 605 that is coupled to the display controller 515 and the video controller 525 to input and output video.

The stack includes a Real Time Control Protocol (RTCP) component 613 for controlling the transport of the media streams using RTP, a H.225 registration, admissions, and status (RAS) messaging component 615 providing H.225 RAS messaging with any included gatekeeper, a H.225 call signalling component 617 providing H.225 call signalling with other terminals, e.g., via the MCU 403, a H.245 control signalling component 619 providing H.245 control signalling with other endpoints, e.g., via the MCU 403, and a T.120 data communication component 621 providing data communication. Components 613, 615, 617, 619, and 621 are all coupled to the transport protocols and network interface 625 of the terminal 411 that provides for sending and receiving packets via the NIC 513.

Not shown are control signals that are used to set up the codec output characteristics of the one or more codecs of the terminal. Such signals are used in an aspect of the invention to set up the codec(s) to encode at a bit rate (and resolution for video) determined by the MCU (or other control entity when no MCU device is used).

A systems control unit provides an interface between the terminal 411 and the signaling components 613, 615, 617, and 619 of the stack. A data application component 627 is connected to the data component 621 and provides an interface between component 621 and the other parts of the terminal 411.

While one embodiment implements all the components shown in FIG. 6 in software, in other embodiments, one or more of the functionalities shown in FIG. 6 may be provided in hardware. For example, one or more of the audio or the video codecs may be provided in part or wholly in hardware or the hardware and software combination.

While a configuration such as shown in FIG. 6 appears similar to a prior art configuration, the components shown in FIG. 6 implement one or more aspects of the invention, and thus in combination are not prior art. In particular, as described in more detail below, as a result receiving one or more control signals, one or more of the video and audio codecs may be configured, e.g., by software in terminal 411, to encode at a specified bit rate. Furthermore, as described in more detail below, as a result receiving one or more control signals, one or more of the video codecs may be configured by software in terminal 411 to encode at a specified resolution. Furthermore, as described in more detail below, as a result receiving one or more signals, the video application and/or the system control unit may configure the display controller 411 to display a video stream as a sub-window at a particular location of a main window on the screen 517. Furthermore, in the case that two or more video codecs or two or more audio codecs are supported at the terminal, the video and audio codecs may be configured to use a particular encoding scheme. For instance, the video may be configured to use H.263, and the audio codec to use G.729

Figure 8:
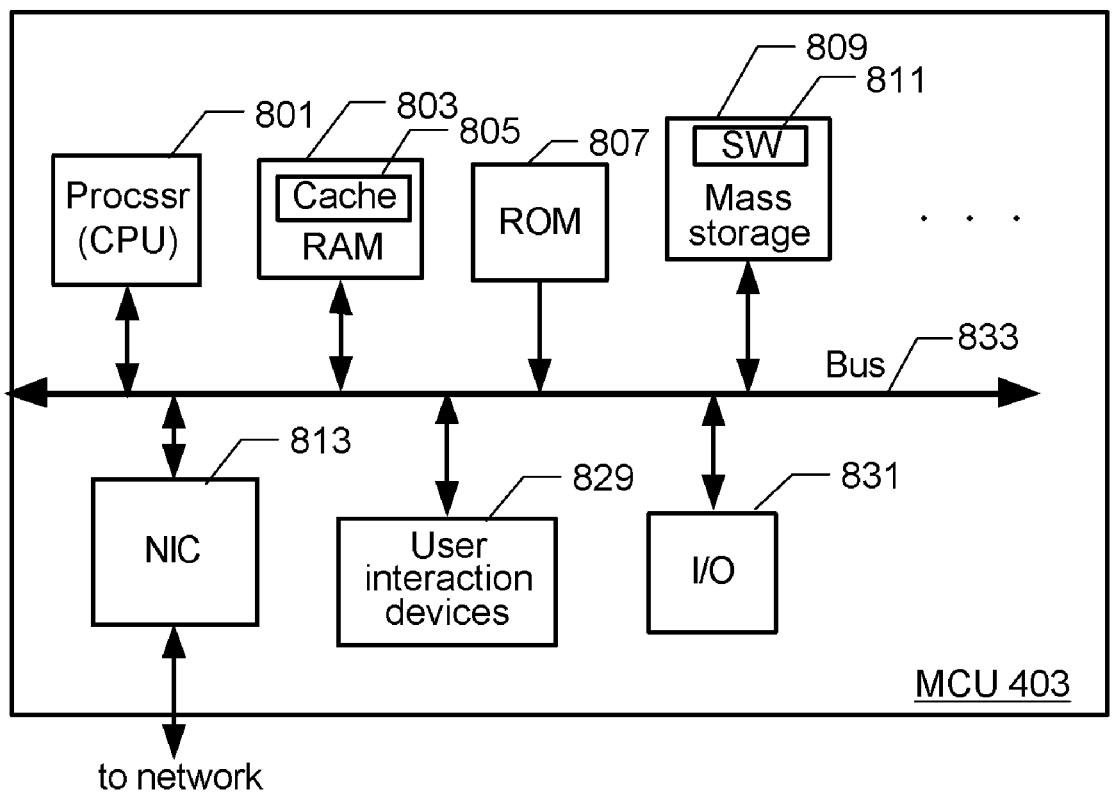
FIG. 8 shows one embodiment of a MCU that is based on a standard computer.

FIG. 8 shows one embodiment of a MCU, e.g., MCU 403 that is based on a standard computer. The MCU includes a central processing unit (CPU) 801, a random access memory (RAM) 803 that includes one or more cache memories 805, a mass storage device 809, a network interface device (NIC) 813 for connecting to network 103, and one or more user interaction devices 829 such as a pointing device, a keyboard, and so forth. MCU 403 may also include a display (not shown). MCU 403 may also include read only memory (ROM) 807 and other I/O devices generally shown as 831 such as a CD-read/write device, an input scanner, a printing device, and so forth. One or more busses, shown symbolically in FIG. 8 as a single bus 833 interconnect the various components. The mass storage device 809 may include a magnetic, optical, or other equivalent storage medium.

While the MCU 403 is shown having a single processor 801, it is to be understood that the MCU may actually have several processors, schematically shown as only one processor in FIG. 8. Thus, those in the art will understand that FIG. 8 is a simplified configuration. Actual implementations may include more or less components than shown.

In one embodiment, the MCU functionality, as well as aspects of the invention operate as software, i.e., one or more computer readable code segments that when loaded into RAM 803 instruct one or more of the processors 801 of MCU 403 to carry out the processes that provide H.323 functionality as well as one or more aspects of the invention. The code segments are carried on a carrier medium, e.g., a magnetic medium as part of storage 809, shown herein as software 811. The code segments may initially be provided as a software product carried in optical media, e.g., a CD-ROM, or carried as signals for transmission via a network.

Consider again the logical configuration shown in FIG. 4. In one embodiment, each participant communicates with MCU 403 using messages such as H.225 messages to set up the channel and H.245 messages to describe the terminal media capability, to negotiate the functions for audio and video processing for each participant, and in accordance with one embodiment of the invention, to negotiate and set the audio and video codec output characteristics at the terminal so that the MCU reduces processing. The MCU intercepts H.245 control messages between the terminals that describe the terminal media capability.

According to one embodiment of the invention, during the H.245 control message exchange, each participant sends its terminal capability to the MCU. The MCU receives the capabilities of each participant, e.g., the codec capability for each of the participating terminals. Based on the received information from the terminals, the MCU determines the codec output characteristics for each participant such that the MCU can simply mix and switch the incoming streams without decoding any stream. This significantly reduces the MCU processing requirements. The term codec output characteristics at the terminal includes one or more of the audio codec type, the video codec type (if there is a video codec), the video resolution (if there is a video codec), the audio bit-rate, and the video bit rate for the output (if there is a video codec). Thus, the determined codec output characteristics for each participant includes a first bit rate and optionally one or more of a first video resolution, a first audio codec type, and a first video codec type. The MCU sends each participant instructions to set the codec to the respective determined codec output characteristics. In one embodiment, the MCU processing requirements are such that no MPs are required, in particular, so that the MCU 403 does not need to transcode any of the video or audio streams to and from each of the participants.

To operate in accordance with an aspect of the invention, a participating codec accepts the message from the MCU to set the codec output characteristics, and set its codec(s) to encode and transmit at the provided codec output characteristics, e.g., the provided bit-rate and on or more of the video and audio codec types and video resolution.

Because the respective codec output characteristics for each participant are determined by the MCU such that no MP function such as transcoding is required, when the MCU receives a media stream from any of the participants, the MC of the MCU simply passes through the media stream to other participants. Because each participant communicates using the agreed codec output characteristics, no transcoding, i.e., decoding and re-encoding of the media streams is required.

Figure 7:
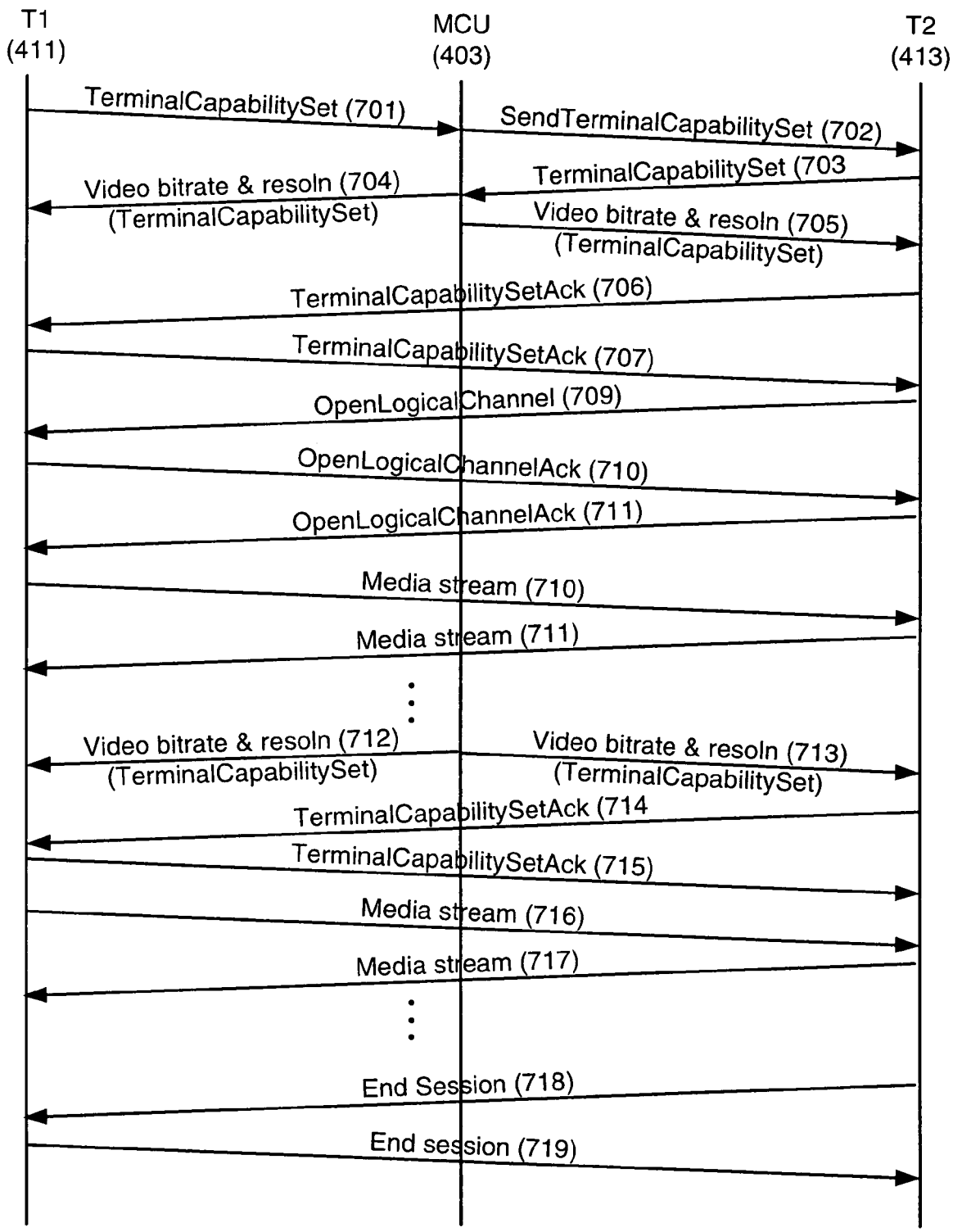
FIG. 7 shows the interaction between a MCU and two participating terminals once a control channel is established between the terminals, in accordance with one or more aspects of the invention.

FIG. 7 shows the interaction between MCU 403 and two participants, e.g., terminals 411 (called T1) and 413 (called T2) after the RAS and other H.225 messaging, i.e., once a H.245 control channel is established between T1 and T2 via the MCU 403. In a message 701, T1 sends a H.245 TerminalCapabilitySet message to T2 (via the MCU) to exchange its capabilities. The H.245 TerminalCapabilitySet message includes a set of fields that together describe the media capabilities of the terminal, including the audio codec type(s), and video codec type(s), the video resolution(s), the maximum bit-rate and some of codec specific options.

Rather than pass the TerminalCapabilitySet message 701 to T2, the MCU waits until it has received TerminalCapabilitySet messages from all participants. In the example of FIG. 7, suppose the MCU 403 actively solicits this information from T2. Thus, in a message 702, MCU 403 sends a SendTerminalCapabilitySet signal to T2 to provide its capabilities.

In one embodiment, the MCU mimics a SendTerminalCapabilitySet message as if it was sent from T1, and sends it to T2. In a message 703, T2 responds with a TerminalCapabilitySet message. The MCU receives this message, and rather than pass message 703 to T1, the MCU waits until it has received TerminalCapabilitySet messages from all participants.

Once the MCU has received TerminalCapabilitySet messages from all participants, the MCU determines codec output characteristics for each of the participants, and sends instructions to the participants to set their respective codec(s) to the respective determined codec output characteristics. In one embodiment, the messages to set the codec(s) are in the form of H.245 TerminalCapabilitySet messages as if from other participant(s), so that the messaging conforms to H.323 messaging. In such an embodiment, the MCU mimics and sends to T1 a TerminalCapabilitySet message as if from T2 to T1, but with the fields in the message set to the determined codec output characteristics for T1. This is shown as message 704. Similarly, the MCU mimics and sends to T2 a TerminalCapabilitySet message 705 as if from T1 to T2, but with the fields in the message set to the determined codec output characteristics for T2.

Terminals T1 (411) and T2 (413) each receives the instructions—as TerminalCapabilitySet message 704 and 705, respectively—and each sets its respective codec(s) to the respective suggested codec output characteristics.

T1 and T2 each acknowledges having received the TerminalCapabilitySet message 704 and 705, respectively after each has set its respective codec(s). The acknowledging is by sending a H.245 TerminalCapabilitySetAck message, shown in FIG. 7 as messages 706 and 707 from T2 and T1, respectively. In a message 709, T2 opens a media channel with T1 by sending a H.245 openLogicalChannel message. In a message 710, T1 acknowledges the establishment of the unidirectional logical channel from T1 to T2 by sending a H.245 openLogicalChannelAck message. Then, In a message 710, T1 opens a media channel with T2 by sending a H.245 openLogicalChannel message. In a message 711, T1 acknowledges the establishment of the unidirectional logical channel from T1 to T2 by sending a H.245 openLogicalChannelAck message. Now the bidirectional media stream communication is established.

The H.323 media streams are shown as messages 710 from T1 and 711 from T2.

Because the codec(s) of each terminal are set to transmit such that the MCU does not need to carry out any decoding and re-encoding, when the MCU receives the media streams 710 and 711 from T1 and T2, respectively, the MCU simply passes the streams onto the other participants.

So long as no other participants join the conference, communication may continue at the respective determined suggested codec output characteristics.

At some stage, however, a new participant may join. In one embodiment, when a new participant joins, such a new participant undergoes the messaging to join the conference. For example, once a H.245 channel is established, the new terminal sends TerminalCapabilitySet message to the other participant(s). In accordance to an embodiment of the present invention, the MCU intercepts the TerminalCapabilitySet message, and, now knowing the capabilities of each terminal—and in one embodiment, the bandwidth requirement of each terminal—the MCU determines updated codec output characteristics for each terminal, e.g., one or more of the audio codec type, video codec type, audio codec output bit rate, video codec output bit rate, and output video resolution. If the codec output characteristics for any terminal have changed, the MCU sends each participating terminal instructions to set its output codec(s) to the respective updated codec output characteristics.

FIG. 7 shows that as a result of a new terminal, e.g., terminal 415 (denoted T3) joining the conference, updated output codec characteristic are sent to T1 and T2 as TerminalCapabilitySet messages 712 and 713, respectively. T1 and T2 each acknowledges (messages 715 and 714, respectively) having received the TerminalCapabilitySet message 712 and 713, respectively, after each has re-set its respective codec(s) to the respective updated characteristics. The MCU's communication with T3 are not shown in FIG. 7.

T1 and T2 now each sends media streams at the new codec output characteristics. T3 also send media streams (not shown). The MCU sends T3's media streams onto T1 and T2 (this sending not shown in FIG. 7).

Again, the output characteristics of each codec are set such that the MCU does not need to do any decoding and re-encoding, but simply passes the media streams onto the other participants.

In one embodiment, a re-determination of the respective codec output characteristics for each participating terminal is carried out by the MCU not only when a new participant joins a conference, but also when a participant leaves the conference. Thus, when a new participant joins the conference, the output bit-rate is either maintained or reduced. When a participant leaves the conference, the output bit-rate is either maintained at the same value, or increased.

Thus, in one embodiment, the exchange of messages between one or more participants and the MCU 403 is when there are any changes in the conferencing environment. The MCU re-determines the respective codec output characteristics for each participating terminal and sends instructions to each participant whose respective codec output characteristics are changed by the re-determination to change its codec output characteristics.

A terminal leaving a conference is detected by the MCU when the participating terminal sending an End Session H.245 message. As an example, T1's and T2's leaving the conference is indicated by End Session messages 719 and 718, respectively.

Adding a Gatekeeper

In the case that a gatekeeper is included, the RAS messaging may also be used to determine when a participant leaves a conference.

It may be that in the initial exchange, one or more of the terminals already have their output codec(s) set at what the MCU later determines is the desired codec output characteristics. In one embodiment, the MCU also sends instructions to those participants whose codec output characteristics need to be changed to their codec output characteristics.

When a gatekeeper is included, the collection of all terminals, gateways, and MCUs managed by a single gatekeeper is known as a H.323 Zone.

One of the functions of a gatekeeper is bandwidth management. Bandwidth management is designated within the process of registration, admissions, and status (RAS). When a gatekeeper is included, all calls must be setup by the RAS process using the gatekeeper.

Bandwidth management uses Bandwidth Request (BRQ), Bandwidth Confirm (BCF) and Bandwidth Reject (BRJ) messages. For instance, if a network manager has specified a threshold for the number of simultaneous conferences on the LAN, the Gatekeeper can refuse to make any more connections once the threshold is reached. The effect is to limit the total conferencing bandwidth to some fraction of the total available; the remaining capacity is left for other services, such as e-mail, file transfers, and other LAN protocols. Bandwidth Control may also be a null function that accepts all requests for bandwidth changes.

In one embodiment of the invention, the gatekeeper bandwidth management function provides the MCU with bandwidth information regarding the multipoint conference. That is, the MCU receives information from the gatekeeper on the input and output bandwidth availability for each of the conference participants. The MCU uses this information to determine a codec output capability for each participant such that each participant's codec capabilities and available bandwidth can be simultaneously met without any media stream from one participant to the other participants needing to be decoded and re-encoded en route to the other participants, As an example, suppose that a gatekeeper allocates a bandwidth that provides a total bandwidth of K bits/sec for video stream sending from MCU 403 to terminal 413. Suppose initially terminals 411 (T1) and 413 (T2) are the only two participants in the conference. Suppose also that terminal 411 can accommodate a bandwidth of K. Initially, after the MCU receives the terminal capability of each of terminals 411 and 413, the MCU determines the codec output characteristics for T1 and T2, in particular, the MCU determines that the output bit rate of the codec(s) of T1 can be set to send a media stream at K bits/sec. The MCU instructs each terminal to set its codec(s) to send a media stream at K bits/sec.

At some stage later, suppose terminal 415 joins the conference. Each terminal, e.g., terminal 413, still has the same bandwidth for receiving streams, since it only receives from the MCU. The MCU, on the other hand, needs to send streams to each participating terminal, e.g., to terminal 413 from all the other participants, i.e., it sends two streams in this bandwidth K to terminal 413. To accommodate both terminal 411's and terminal 415's streams within the bandwidth of K bits/sec, the MCU re-determines the output bit rate of the codec(s) of the other participants to K/2 bits/sec. Thus, the MCU instructs each of the terminals 411, 413, and 415 to set their individual codecs to generate a media stream at K/2 bits/sec. For example, the MCU receives media streams, each at K/2 bits/sec, from T1 (411) and T3 (415), and is able to forward both media streams to terminal 413 in the channel bandwidth of K from the MCU 403 to terminal 413.

Viewing Participants' Video in Different Windows

One of the functions of MPs is mixing video, for example to generate a screen that includes the video streams from each participant. In the prior art, mixing might require decoding the individual video streams, combining the decoded streams to generate a new display, and re-encoding the display.

Another aspect of the invention is that the MCU 403 does not need to carry out any video mixing. In the case that the terminal device supports window viewing—as is the case for example with PC-based terminals—when a terminal receives a media stream that includes video from a participating terminal, it opens a window for that terminal's video. Each media stream that includes video from a new terminal leads to a new window being opened. Thus, in one embodiment, video streams from different participating terminals are displayed in different windows located at different locations on the terminal's screen. In this manner, the MCU 403 need not carry out any explicit mixing that might require decoding and re-coding the video streams. Because all terminals' output video can be displayed at each terminal, no switching is necessary, so that in one embodiment, all the mixing and switching functionality of MCU 403 can be completely eliminated.

In embodiment, the MCU 403 adds to each media stream from each participant an indication of position of a respective sub-window for the terminal's video output to be displayed in a window that includes a plurality of sub-windows for the participants' videos. Each terminal reads the indication of position from the video stream and translates the indication to a signal for its video display to display the stream from the participant in an appropriately sized window in a respective position so that all streams may be simultaneously viewed in one window. The indication of position in one embodiment is an x,y position. In another embodiment, the indication of position is an indication of the identity of the participant that is translated to a sub-window position at the terminal.

In one embodiment, the MCU has traditional MC functionality together with the messaging described herein to control the encoding bit rate (and in some embodiment, the video resolution) from each endpoint.

In another embodiment, the MC functionality is distributed amongst the terminal devices, completely eliminating the need of a separate MCU unit. The description above of the functioning of the MCU, including the determining of the participants' respective codec output characteristics based on the capabilities/requirements of all the participants, is then carried out at one or more of the terminals rather than at a separate MCU unit.

Note that because the encoded video from a terminal is passed onto other participating terminals, each of the participants may have a different resolution. In particular, the set of codec output characteristics set by the MCU for each terminal need not be the same for each terminal so long as the capability/requirement needs of each terminal are met. Thus, the video from the different participating terminals may have different resolutions and bit rates, yet easily be displayed at each terminal with no processing required at the MCU. Implementing different resolutions and bit rates using a prior art central MCU requires a lot of processing. Thus, one embodiment of the invention provides flexibility in displaying the decoded videos.

Thus a MCU has been described that performs media controlling and that forwards the encoded media streams as needed. Because no transcoding of any the video is carried out, the quality of each encoded video output from each of the participating terminals is preserved. There is no additional quantization error that might be introduced if re-coding occurs, e.g., at the MCU. Furthermore, because the MCU carries out no MP processing, the multipoint conferencing delay may be reduced.

Eliminating the Centralized MCU for Media Stream Communication

In an alternate embodiment, once the codec output characteristics for each participating terminal has been set according to the methods described above, each participating terminal multicasts its output media stream(s), e.g., it's output audio and video streams directly to all other participants. As described above, no decoding, scaling, re-assembling, resolution reducing, or re-coding are needed. Such a multicast method is suitable, for example, in a corporate shared LAN structure. That is, once the MCU determines the respective codec output characteristics that simultaneously meet the codec and bandwidth requirements of all participants, the MCU instructs the participants to communicate media streams directly, thereby bypassing the MCU.

Intelligent MCU Minimizing MP Processing

One MCU implements a method of controlling the multimedia conference by receiving from each participant information on the capabilities of its one or more codecs. In the case a gatekeeper is included, the MCU also receives information from the gatekeeper on the input and output bandwidth availability for each of the conference participants.

Once the information on the codec(s) of and, if there is a gatekeeper, the bandwidth allocation for all the participants, the MCU ascertains if there is a set of respective codec output characteristics for all participants such that each participant's codec capabilities and available bandwidth can be simultaneously met without any media stream from one participant to the other participants needing to be decoded and re-encoded en route to the other participants. If so, the MCU determines the codec output characteristics for all participants that simultaneously meet each participant's codec capabilities and available bandwidth without any decoding and re-encoding being needed.

If the MCU ascertains that there is no set of respective codec output characteristics for all participants such that they can communicate media streams without any en route decoding and re-encoding, the participants are instructed to communicate media streams via the MCU.

In one embodiment, the MCU first determines the set of codec characteristics that the largest subset of participants can communicate with, and instructs the capable participants to communicate with that set of codec characteristics codec characteristics. The MCU then determines a second set of codec characteristics that the largest subset of the remaining participants can communicate and instructs those participants them to communicate using the second set of codec characteristics. The MCU repeats the determining of common codec characteristics until all participants have been included. In this manner, the amount of MP processing needed for transcoding between different types of codecs is minimized.

At this stage, the MCU carries out traditional MP functions, such as decoding, re-sizing, mixing, and re-encoding the media streams, serving as a gateway to interconnect between different groups, such that the codec capabilities of and available bandwidth for the participants are simultaneously met.

One version instructs the participants to bypass the MCU if possible. In such an embodiment, the MCU ascertains whether a set of respective codec output characteristics can be determined for the participants so that they all simultaneously meet their respective codec capabilities and available bandwidth by communicating the media streams directly, bypassing the MCU. If so, the participants are then instructed to set their respective codec and communicate any media streams directly with the other participants.

An improved MCU embodiment determines if it is possible for at least some of the participants to communicate media streams that do not need to be decoded and re-encoded. Such an MCU receives the output codec capabilities of each participant, and also, when there is a gatekeeper, the input and output bandwidths allocated to each participant. Using this received information, the MCU ascertains if there is a subset of the participants and respective codec output characteristics for all participants in the subset such that the subset participants can communicate media streams without any en route decoding and re-encoding. In one embodiment, all participants communicate via the MCU. Media streams from participants of the subset are passed on to the other participants without decoding and re-encoding. The MCU also received media streams from participants that are not in the subset, and for such media streams, carries out traditional MP functions, such as decoding, re-sizing, mixing, and re-encoding such that the codec capabilities of and available bandwidth for the participants are simultaneously met.

In another embodiment, the MCU attempts to further divide the rest of participants into another common subset who shares the same codec output characteristics. The MCU continues so dividing the participants until all participants are included.

Thus, In one embodiment, the MCU selects a first set of common codec characteristics, and instructs the subset of the participants that are capable of encoding at the first set of common codec characteristics to set their respective codecs to output at that first set of common codec characteristics. If the first subset does not include all participants, the MCU finds a second set of codec characteristics for the remaining participants, and instructs the subset of the remaining participants that are capable of encoding with the second set of codec characteristics to so communicate. The MCU repeats these steps until all participants have been instructed with respective codec characteristics. By so partitioning the set of participants into subsets that each has common codec characteristics, the MCU minimizes the amount of MP processing needed for transcoding between different types of codecs.

In one version, the MCU further ascertains if there is a subset of the participants and respective codec output characteristics for all participants in the subset such that the subset participants can communicate media streams directly to each other. Those participants in the subset are instructed to communicate media streams directly. The others communicate via the MCU.

Thus the MCU determined the configuration for each of the participants so that the amount of MP processing of the media streams is minimized.

Whenever there is a change in the configuration, e.g., by an participants leaving the conference or a new participant joining the conference, the MCU collects any new data, e.g., the new bandwidth allocations and the codec capabilities of any joining participant, and re-ascertains the configuration that minimizes the MP processing.

Different Encoding and Decoding

As described above, it may be that some terminals are restricted from encoding one or more formats and can decode such formats. For example, video streams compressed according to advanced techniques such as the H.264/MPEG-4 codec may require significant computational power to encode, and significantly less computational power to decode. In one embodiment, the decoding capabilities and the encoding capabilities of each terminal may be separately specified, e.g., during set-up of the terminals, and such capabilities be transmitted via the MCU as part of the terminal capabilities. In determining each participant's codec output characteristics such that en route encoding or decoding is not required, the MCU can specify the codec output characteristics for one terminal to include encoding using a codec that one or more other terminals can decode but cannot encode.

One embodiment uses H.245 signaling to communicate the terminal capability set the TerminalCapabilitySet message). The semantics for such messages provides for optionally separately specifying the receive video capability (receiveVideoCapability) and transmit Capability (transmitVideoCapability). Each such message includes a list of video codecs, and for each type of video codec supported, a list of capabilities. The list capabilities for each video codec for each direction (transmit or receive) includes the frame sizes/resolution, the frame rates, options, and so forth.

Thus a particular terminal may have different encoding and decoding capabilities, e.g., because of different processing power available. As an example, consider a simple low-power PC implements a terminal and includes a software H.323 stack that has several of codecs, including a H.264 codec. However, because the PC has low computational power, it is decided that this terminal should not be permitted to carry out H.264 encoding (transmit processing), even though it can, albeit relatively slowly. When the terminal is set up to operate, it set up to report as its codec capabilities receive video capabilities that include H.264, bit transmit video capabilities that exclude H.264. Thus, the terminal sends one or more H.245 messages that it can decode but not encode H.264. The MCU receives the capabilities of each terminal and determines how each terminal should set up its output, i.e., the codec output characteristics for each codec. When the MCU instructs each endpoint what codec outputs to set up and how, i.e., which of each endpoint's codec(s) and at what bit rate and possible resolution, the codec(s) of the example terminal will not be set up to encode H.264. However, some other terminal, e.g., one that has a relatively powerful processor, or a hardware encoder, may be set up so it can send H.264 to this terminal.

Note that while the invention has been described in terms of endpoints that are terminals, those in the art will recognize that the invention may also be applicable to controlling other endpoints, e.g., gateways.

It should be appreciated that although the invention has been described in the context of the popular H.323 ITU-T Recommendation, the invention is not limited to such a context and may be utilized in various other applications and systems. For example, the invention may be utilized in other ITU-T based systems such as H.320. Other Protocols and/or standards other than the popular H.323 are known or may become known that also provide for multipoint multimedia conferencing. One such protocol is the Session Initiation Protocol (SIP), Internet Engineering Task Force IETF proposed standard RFC 2543. SIP is a text-based protocol for initiating interactive communication sessions between users. Such sessions include voice, video, chat, interactive games, and virtual reality, applicable, for example, to an IP network. Thus, with SIP, a session could be a simple two-way telephone call using voice over IP (VoIP) or it could be a collaborative multi-media conference session. The functions of the MCU are handled in SIP by a unit called the conference server. Other protocols also may be known. Each of these protocols may include a control unit that controls the multipoint conference. While such controllers may have different names than the MultiPoint Control Units described in H.323, the invention is also applicable to such controllers.

While one embodiment of the MCU uses H.245 compatible control message to signal the terminals, other embodiments use other control messages not necessarily conforming to H.245 and those messages may be completely proprietary.

Furthermore, while the invention has been described in terms of a computer-based architecture for the terminal, the invention is not limited to any one type of terminal architecture. Furthermore, while the invention has been described in terms of a computer-based architecture for the MCU, the invention is not limited to any one type of MCU architecture.

Furthermore, aspects of the invention may be implemented in software, in hardware, or in a combination of hardware and software.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of controlling a multimedia multipoint conference that includes a plurality of participants, each participant a multimedia terminal that includes one or more codecs or a gateway that includes one or more codecs, the method implemented in all participant of the conference, the method comprising:

receiving from each other participant information on the capabilities of its one or more codecs as part of a terminal capabilities exchange between the participants;

ascertaining if there is a set of codec output characteristics for all participants such that each participant's codec capabilities can be simultaneously met without any media stream from one participant to the other participants needing to be decoded and re-encoded en route to the other participants, and if so, determining, in cooperation with the other participant or participants, the codec output characteristics for all participants that simultaneously meet each participant's codec capabilities without any decoding and re-encoding being needed, the codec output characteristics including one or both of a codec type and a bit rate; and sending instructions to the participants to set the participant's respective one or more codecs to the respective determined codec output characteristics;

such that after each participant's one or more codecs are set to the respective codec output characteristics, the participants can successfully send and receive media streams encoded at the respective determined codec output characteristics of the respective terminal without any en-route decoding and re-encoding of any of the media streams and without any participant needing to carry out video mixing to generate its output video stream, and wherein Multipoint Control Unit (MCU) functionality is carried out by the participants operating jointly and cooperatively to jointly determine how to communicate with each other without any transcoding, with no single terminal or device needing act as a Multipoint Controller (MC), such that no distinct MCU device or functionality is needed for conferencing between the participants;

wherein if the step of ascertaining ascertains that there are not codec output characteristics that simultaneously meet the codec capabilities of all participants, the method includes: ascertaining whether there is a subset of participants and a first set of codec output characteristics that simultaneously meet the codec capabilities of all members of the subset;

if such a subset and first set of common codec output characteristics exist, directing the subset members to communicate using the common codec output characteristics; and directing those participants whose codec characteristics cannot be met by a common set of codec output characteristics shared by more than one participant to communicate via an (MCU), the MCU including one or more Multipoint Processors (MPs) that can decode, scale, and re-encode streams as necessary to meet the codec requirements of the participants.

2. A method as recited in claim 1, wherein the sending instructions is only to those of the other participants whose one or more modems need to be re-set in order for the respective participant to send media streams at the respective determined codec output characteristics.

3. A method as recited in claim 1, wherein the conference includes a gatekeeper coupled to the network, the method further comprising:

receiving information from the gatekeeper on the input and output bandwidth availability for each of the conference participants, wherein the ascertaining ascertains if there are a set of codec output characteristics for all participants such that each participant's codec capabilities and available bandwidth can be simultaneously met without any media stream from one participant to the other participants needing to be decoded and re-encoded en route to the other participants, wherein the set of determined codec output characteristics for all participants further simultaneously meet each participant's available bandwidth without any decoding and re-encoding being needed.

4. A method as recited in claim 1, wherein the network is a packet network.

5. A method as recited in claim 4, wherein the media streams conform to ITU-T Recommendation H.323.

6. A method as recited in claim 1, wherein the network is a switched circuit network.

7. A method as recited in claim 1, wherein the media streams conform to ITU-T Recommendation H.320.

8. A method as recited in claim 1, wherein the receiving information on codec characteristics is in the form of a TerminalCapabilitySet message conforming to ITU-T Recommendation H.245.

9. A method as recited in claim 8, wherein the instruction sent to a particular other participant is in the form of a TerminalCapabilitySet message conforming to ITU-T Recommendation H.245.

10. A method as recited in claim 1, wherein the one or more participants each have at least one video codec and wherein the media streams include video streams.

11. A method as recited in claim 10, wherein the information received from any particular other participant on the particular other participant's codec capabilities may include a receive video capability that is different than the particular other participant's transmit video capability.

12. A method as recited in claim 10, wherein a particular participant includes a screen and displays the streams from other participants in different windows on the screen such that all video streams may be simultaneously displayed on the screen of the particular participant without the video streams needing to be decoded, mixed, and re-encoded as a mixed stream prior to being sent to the particular participant.

13. A method as recited in claim 1, wherein the media streams include audio streams.

14. A method as recited in claim 1, wherein the steps of receiving, ascertaining, determining and instructing are repeated every time a new participant joins the conference, the repeating of the receiving being from the new participant.

15. A method as recited in claim 1, wherein the steps of ascertaining, determining and instructing are repeated every time a participant leaves the conference.

16. A controller to control a multimedia multipoint conference, the conference including a plurality of participants, each participant being a multimedia terminal device that includes the controller and one or more codecs, the controller comprising:

At least one processor, wherein the controller further comprises:

means for receiving from each other participant information on its codec capabilities as part of a terminal capabilities exchange between the participants;

means for ascertaining if there is a set of codec output characteristics for all participants such that each participant's codec capabilities can be simultaneously met without any media stream from one participant to the other participants needing to be decoded and re-encoded en route to the other participants, and if so, determining, in cooperation with the other participant or participants, the codec output characteristics for all participants that simultaneously meet each participant's codec capabilities without any decoding and re-encoding being needed, the codec output characteristics including one or both of a codec type and a bit rate;

means for sending instructions to the participants to set each participant's respective one or more codec(s) to the respective determined codec output characteristics;

after each participant's one or more codecs are set to the respective codec output characteristics, means for receiving a media stream from one or more of the other participants, the media stream from any particular other participant being encoded at the determined codec output characteristics for the particular other participant; and means for passing the received media streams to each other participant, the determined codec output characteristics being such that the received media streams may be passed to each participant without any en-route decoding and re-encoding of any of the media stream, and without any participant needing to carry out video mixing to generate its output video stream, wherein Multipoint Control Unit (MCU) functionality is carried out by the participants operating jointly and cooperatively to jointly determine how to communicate with each other without any transcoding, with no single terminal or device necessarily needing to act as a Multipoint Controller (MC), such that no distinct MCU device or functionality is needed for conferencing between the participants;

wherein if the means for ascertaining ascertains that there are not codec output characteristics that simultaneously meet the codec capabilities of all participants, then ascertaining whether there is a subset of participants and a first set of codec output characteristics that simultaneously meet the codec capabilities of all members of the subset;

wherein if such a subset and first set of common codec output characteristics exist, directing the subset members to communicate using the common codec output characteristics; and directing those participants whose codec characteristics cannot be met by a common set of codec output characteristics shared by more than one participant to communicate via an (MCU), the MCU including one or more Multipoint Processors (MPs) that can decode, scale, and re-encode streams as necessary to meet the codec requirements of the participants.

17. A controller as recited in claim 16, the controller coupled to a packet network, the means for sending via the packet network, and the means for receiving via the packet network.

18. A controller as recited in claim 17, wherein the media streams conform to ITU-T Recommendation H.323.

19. A controller as recited in claim 16, the controller coupled to a switched circuit network, the means for sending via the switched circuit network, and the means for receiving via the switched circuit network.

20. A controller as recited in claim 16, wherein the media streams conform to ITU-T Recommendation H.320.

21. A controller as recited in claim 16, wherein the receiving information on codec characteristics is in the form of a TerminalCapabilitySet message conforming to ITU-T Recommendation H.245.

22. A controller as recited in claim 21, wherein the means for sending instructions sends the instructions in the form of a TerminalCapabilitySet message conforming to ITU-T Recommendation H.245.

23. A controller as recited in claim 16, wherein the one or more participants each have at least one video codec and wherein the media streams include video streams.

24. A controller as recited in claim 23, wherein the information received from any particular other participant on the particular other participant's codec capabilities may include a receive video capability that is different than the particular other participant's transmit video capability.

25. A controller as recited in claim 16, further comprising:
means for receiving information that a new participant is joining or that one or more participants are leaving the conference, the information that a new participant is joining including information on the new participant's codec capabilities,
wherein the means for determining re-determines codec output characteristics for each remaining participant, including any new participant; and
wherein the means for sending instructions sends instructions to any new participant and at least those participants whose respective re-determined codec output characteristics are changed by the re-determining to set their respective one or more codec(s) to the respective re-determined codec output characteristics,
the re-determined codec output characteristics being such that the received media streams may be passed to each participant including any new participant without any decoding and re-encoding.

26. A computer readable storage medium storing computer-executable instructions that when executed by processors of a processing system in a plurality of participants of a multimedia multipoint conference, cause the participants to implement a method of controlling the multimedia multipoint conference, the conference including the plurality of participants, each a multimedia terminal device that includes one or more codecs, the method comprising:
receiving from each other participant information on its codec capabilities as part of a terminal capabilities exchange between the participants;
ascertaining if there is a set of codec output characteristics for all participants such that each participant's codec capabilities can be simultaneously met without any media stream from one participant to the other participants needing to be decoded and re-encoded en route to the other participants, and if so, determining, in cooperation with the other participant or participants, the codec output characteristics for all participants that simultaneously meet each participant's codec capabilities without any decoding and re-encoding being needed, the codec output characteristics including one or both of a codec type and a bit rate;

sending instructions to the participants to set each participant's respective one or more codecs to the respective determined codec output characteristics;

after each participant's one or more codecs are set to the respective codec output characteristics, receiving a media stream from one or more of the other participants, the media stream from any particular other participant being encoded at the determined codec output characteristics for the particular other participant; and passing the received media streams to each participant, the determined codec output characteristics being such that the received media streams may be passed to each participant without en-route decoding and re-encoding of any of the media stream, and without any participant needing to carry out video mixing to generate its output video stream, wherein Multipoint Control Unit (MCU) functionality is carried out by the participants operating jointly and cooperatively to jointly determine how to communicate with each other without any transcoding, with no single terminal or device necessarily needing to act as a Multipoint Controller (MC), such that no distinct MCU device or functionality is needed for conferencing between the participants;

wherein if the step of ascertaining ascertains that there are not codec output characteristics that simultaneously meet the codec capabilities of all participants, the method includes: ascertaining whether there is a subset of participants and a first set of codec output characteristics that simultaneously meet the codec capabilities of all members of the subset;

if such a subset and first set of common codec output characteristics exist, directing the subset members to communicate using the common codec output characteristics; and directing those participants whose codec characteristics cannot be met by a common set of codec output characteristics shared by more than one participant to communicate via an (MCU), the MCU including one or more Processors (MPs) that can decode, scale, and re-encode streams as necessary to meet the codec requirements of the participants.

27. A tangible computer readable medium as recited in claim 26, wherein the receiving information on codec characteristics is in the form of a TerminalCapabilitySet message conforming to ITU-T Recommendation H.245.

28. A tangible computer readable medium as recited in claim 27, wherein the instruction sent to a particular other participant is in the form of a TerminalCapabilitySet message conforming to ITU-T Recommendation H.245.

29. A tangible computer readable medium as recited in claim 26, wherein the sending and receiving is via a packet network.

30. A tangible computer readable medium as recited in claim 29, wherein the media streams conform to ITU-T Recommendation H.323.

31. A tangible computer readable medium as recited in claim 26, wherein the sending and receiving is via a switched circuit network.

32. A tangible computer readable medium as recited in claim 26, wherein the media streams conform to ITU-T Recommendation H.320.

33. A tangible computer readable medium as recited in claim 26, wherein the one or more participants each have at least one video codec and wherein the media streams include video streams.

34. A tangible computer readable medium as recited in claim 33, wherein the information received from any particular other participant on the particular other participant's codec capabilities may include a receive video capability that is different than the particular other participant's transmit video capability.

35. A tangible computer readable medium as recited in claim 26, wherein the method further includes:

receiving information that a new participant is joining or that one or more participants are leaving the conference, the information that a new participant is joining including information on the new participant's codec capabilities;

re-determining codec output characteristics for each remaining participant, including any new participant; and sending instructions to any new participant and at least those participants whose respective re-determined codec output characteristics are changed by the re-determining to set their respective one or more codec(s) to the respective re-determined codec output characteristics, the re-determined codec output characteristics being such that the received media streams may be passed to each participant including any new participant without any decoding and re-encoding.

36. A controller to control a multimedia multipoint conference, the conference including a plurality of participants, each a multimedia terminal that includes one or more codecs, the controller being on a first participant of the participants, the controller comprising:

a processor;

memory coupled to the processor; and a network interface device coupled to the processor, the network interface device for communicating via a network with the participants, wherein the processor is programmed to receive messages from and send messages to the other participants via the network interface device, including receiving from each other participant information on its codec capabilities as part of a terminal capabilities exchange between the participants, wherein the processor is programmed further to ascertain if there is a set of codec output characteristics for all participants such that each participant's codec capabilities can be simultaneously met without any media stream from one participant to the other participants needing to be decoded and re-encoded en route to the other participants, and if so, determining, in cooperation with the other participant or participants, the codec output characteristics for all participants that simultaneously meet each participant's codec capabilities without any decoding and re-encoding being needed, the codec output characteristics including one or both of a codec type and a bit rate;

wherein the processor is programmed further to send instructions to the participants via the network interface device to set each participant's respective one or more codec(s) to the respective determined codec output characteristics, wherein the processor is programmed further to receive a media stream from one or more of the other participants via the network interface device after each participant's one or more codecs are set to the respective codec output characteristics, the media stream from any particular other participant being encoded at the determined codec output characteristics for the particular other participant, and wherein the processor is programmed further to pass the received media streams to each other participant via the network interface device, the determined codec output characteristics being such that the received media streams may be passed to each participant without any en-route decoding and re-encoding of any of the media stream, and without any participant needing to carry out video mixing to generate its output video stream, wherein Multipoint Control Unit (MCU) functionality is carried out by the participants operating jointly and cooperatively to jointly determine how to communicate with each other without any transcoding, with no single terminal or device necessarily needing to act as a Multipoint Controller (MC), such that no distinct MCU device or functionality is needed for conferencing between the participants;

wherein if the processor ascertains that there are not codec output characteristics that simultaneously meet the codec capabilities of all participants, ascertaining whether there is a subset of participants and a first set of codec output characteristics that simultaneously meet the codec capabilities of all members of the subset;

if such a subset and first set of common codec output characteristics exist, directing the subset members to communicate using the common codec output characteristics; and directing those participants whose codec characteristics cannot be met by a common set of codec output characteristics shared by more than one participant to communicate via an (MCU), the MCU including one or more Multipoint Processors (MPs) that can decode, scale, and re-encode streams as necessary to meet the codec requirements of the participants.

37. A controller as recited in claim 36, wherein the receiving information on codec characteristics is in the form of a TerminalCapabilitySet message conforming to ITU-T Recommendation H.245.

38. A controller as recited in claim 37, wherein the instruction sent to a particular other participant is in the form of a TerminalCapabilitySet message conforming to ITU-T Recommendation H.245.

39. A controller as recited in claim 36, wherein the network is a packet network.

40. A controller as recited in claim 36, the network is a—circuit switched network.

41. A controller as recited in claim 39, wherein the media streams conform to ITU-T Recommendation H.323.

42. A controller as recited in claim 41, wherein the participants communicate with a gatekeeper whose function includes allocating bandwidth, and wherein the determining of the codec output characteristics for each participant includes using information on the bandwidth allocated to one or more of the participants.

43. A controller as recited in claim 36, wherein the one or more participants each have at least one video codec and wherein the media streams include video streams.

44. A controller as recited in claim 43, wherein the information received from any particular other participant on the particular other participant's codec capabilities may include a receive video capability that is different than the particular other participant's transmit video capability.

45. A controller as recited in claim 43, wherein a particular participant includes a screen and displays the streams from other participants in different windows on the screen such that all video streams may be simultaneously displayed on the screen of the particular participant without the video streams needing to be decoded, mixed, and re-encoded as a mixed stream prior to being sent to the particular participant.

46. A controller as recited in claim 36, wherein the media streams include audio streams.

47. A controller as recited in claim 36, wherein the processor further is programmed to:

receive information that a new participant is joining or that one or more participants are leaving the conference, the information that a new participant is joining including information on the new participant's codec capabilities;

re-determine codec output characteristics for each remaining participant, including any new participant; and send instructions to any new participant and at least those participants whose respective re-determined codec output characteristics are changed by the re-determining to set their respective one or more codec(s) to the respective re-determined codec output characteristics, the re-determined codec output characteristics being such that the received media streams may be passed to each participant including any new participant without any decoding and re-encoding.

* * * * *

UNITED STATES PATENT AND TRADEMARK OFFICE
CERTIFICATE OF CORRECTION

PATENT NO.        : 7,627,629 B1                                       Page 1 of 1
APPLICATION NO.   : 10/326617
DATED             : December 1, 2009
INVENTOR(S)       : Wu et al.

It is certified that error appears in the above-identified patent and that said Letters Patent is hereby corrected as shown below:

On the Title page, add

-- Related U.S. Application Data

(60)  Provisional Application No. 60/422,201, filed on October 30, 2002. --

On column 1 line 4 before the title "BACKGROUND" insert

-- RELATED APPLICATIONS

The present invention claims priority of U.S. Provisional Application No. 60/422,201, filed on October 30, 2002. --

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,627,629 B1 | Page 1 of 1 |
| APPLICATION NO. | : 10/326617 | |
| DATED | : December 1, 2009 | |
| INVENTOR(S) | : Wu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1336 days.

Signed and Sealed this

Twenty-first Day of December, 2010

David J. Kappos
*Director of the United States Patent and Trademark Office*